INVENTOR.
CLARENCE W. PORTER
ROBERT C. MIERENDORF
BY
*William H. Schmeling*

3,209,238
VOLTAGE CONTROL APPARATUS WITH PROTECTIVE DEVICE
Robert C. Mierendorf, Wauwatosa, and Clarence W. Porter, Glendale, Wis., assignors to Square D Company, Park Ridge, Ill., a corporation of Michigan
Continuation of application Ser. No. 669,807, July 3, 1957. This application Dec. 1, 1961, Ser. No. 156,432
5 Claims. (Cl. 323—24)

This invention relates to electronic welding circuits and is more particularly concerned with welding circuits wherein the energization of the welding transformer is controlled by a pair of ignitrons and is a continuation of a now abandoned application Serial Number 669,807, filed July 3, 1957.

When the ignitrons are used to control the current flow through the primary winding of a welding transformer, the ignitrons are usually connected back to back in inverse parallel so the ignitrons will become alternately conductive and pass alternate half cycles of current to the primary winding of the welding transformer.

While the ignitrons of present manufacture have been found generally reliable, ignition failures occasionally occur and frequently escape timely detection. It is well known that the quality of a good weld is dependent upon the heat supplied during the weld cycle and that the heat applied is dependent on the total current passing through the welding transformer. Thus, when one of the pair of ignitrons fails, only half of the required current will pass through the welding transformer during the welding cycle. If the operation of the defective welder is continued on an assembly line, a large number of imperfect welds will be made before the presence of the defective ignitron is discovered. Further, it is well known the failure of one of the ignitron tubes will cause the other ignitron to supply pulsating direct current to the primary winding of the weld transformer. This pulsating direct current will rapidly saturate the iron of the welding transformer and thereby decrease the impedance of the primary winding. This will cause the current flow through the firing ignitron to increase to an abnormaly high value and cause the line fuse to open. This is particularly undesirable when the welder which caused the abnormal line current is connected in the same circuit with other welders. This arrangement is frequently used on a welding assembly line and will result in the shutdown of the entire line until the faulty ignitron is located.

The device according to the present invention may be used with any conventional single-phase ignitron welding controller such as is disclosed in U.S. Patent 2,703,383, which has been assigned to the assignee of the present invention, and when incorporated into a welding circuit such as described, will eliminate the difficulties heretofore set forth. It is an object, therefore, of the present invention to detect the misfire of any of the ignitrons in an electronic welding circuit.

A further object of the present invention is to combine a simple, inexpensive and reliable magnetic device with a welding transformer to detect failures in either of a pair of ignitrons which control current flow through the transformer.

Another object of the present invention is to detect failure of either of a pair of ignitron tubes in an electronic welding circuit and to indicate which of the tubes has failed.

A still further object of the present invention is to include a magnetically actuated means in circuit with the welding electrode transformer of an electronic welding apparatus which means will instantly detect the failure of either one of a pair of ignitrons of the apparatus.

Another object of the present invention is to combine a device in circuit with a welding transformer to detect failure of either one of a pair of ignitrons controlling current flow through the transformer.

A further object of the present invention is to combine a magnetically actuated means with a welding transformer controlled by a pair of ignitrons thereby to detect misfire of either of the ignitrons.

Further objects and features of the invention will be readily apparent to those skilled in the art from the specification and appended drawings ilustrating a preferred embodiment, in which.

Figures 1, 2:
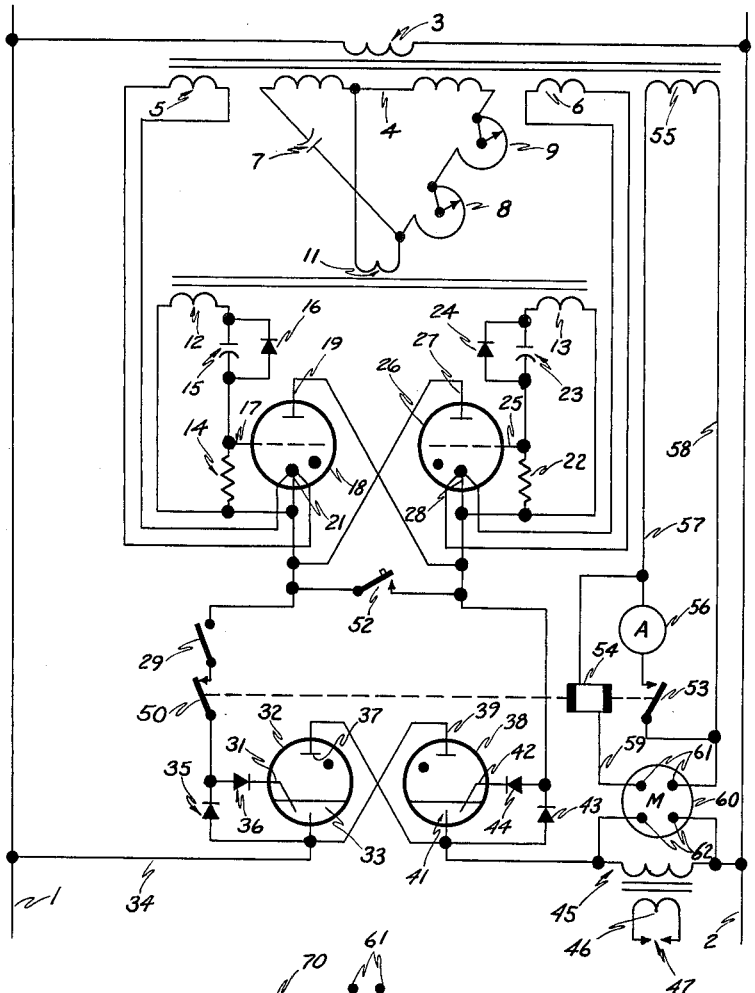
FIG. 1 shows a wiring diagram of an electronic welding apparatus incorporating the features of the present invention.
FIG. 2 illustrates one form of a magnetically actuated means which may be used in the circuit in FIG. 1.

In the drawings, and in FIG. 1 particularly, the numerals 1 and 2 designate a pair of main supply lines connected to a source of energy which is not shown. Connected across lines 1 and 2 is a transformer 3 having a plurality of secondary windings 4, 5, and 6. The secondary winding 4 of the transformer 3 supplies energy to a phase-shifting circuit comprising a capacitor 7 and a pair of rheostats 8 and 9. Connected to a mid-tap of the secondary winding 4 and to a point between the capacitor 7 and the rheostat 8 is the primary winding of a transformer 11 having secondary windings 12 and 13. Across the secondary winding 12 is connected a series circuit comprising a resistor 14 and a capacitor 15, the capacitor 15 having in parallel therewith a half wave rectifier 16. The resistor 14 at one end is connected to the control grid 17 of an electronic tube 18 having an anode 19 and a cathode 21, the latter element being also connected to the resistor 14 at its other end.

Across the secondary winding 13 of transformer 11 there is disposed a series circuit comprising a resistor 22 and a capacitor 23, a rectifier 24 being connected across the capacitor 23. The resistor 22 is connected at one end to a control grid 25 of an electronic tube 26 having an anode 27 and a cathode 28, the latter element also being connected to resistor 22 at its other end. It should be noted from FIG. 1 that the tubes 18 and 26 are connected in inverse parallel and that the grid circuits for these tubes are identical and are supplied from the same transformer 11. The secondary windings 5 and 6 of the transformer 3 supply electrical energy to heat the cathodes 21 and 28 of tubes 18 and 26, respectively.

The cathode 21 is connected in circuit through an initiating contact 29 through rectifiers 35 and 36 to the mercury cathode 33 and igniter 31 respectively of an ignitron 32 having an anode 37. The cathode 33 is electrically connected to line 1 by a conductor 34.

Connected in inverse parallel with the ignitron 32 is a second ignition 38 having an anode 39, a mercury cathode 41, and an igniter 42. The cathode 28 of tube 26 is connected to the cathode 41 and the igniter 42 through the rectifiers 43 and 44, respectively.

Connected between the lines 1 and 2 through the ignitrons 32 and 38 is a welding transformer 45 having a secondary winding 46 across which a pair of welding electrodes 47 are disposed.

In the foregoing description of the circuit, certain conventional elements such as surge bypass capacitors, thermal flow switches, etc., have been eliminated for the purposes of simplicity, their position and operation being well known to those familiar with the art.

The operation of the foregoing circuit will now be described. As soon as main supply lines 1 and 2 are connected to a source of electrical energy, the transformer 3 is energized, the secondaries 5 and 6 thereof heating the cathodes of tubes 18 and 26 respectively, and the secondary 4 energizing the phase-shifting circuit.

The rheostat 9 is adjusted so the transformer 11, the primary of which is connected in the phase-shifting circuit, will deliver positive pulses to its secondary windings no earlier than the phase position of the normal current zero for the particular welding transformer used, the reference being, of course, the main line voltage. The rheostat 8 may be adjusted as desired to cause these positive pulsations to occur later to achieve heat control as desired.

As the secondary winding 12 begins to drive the control grid 17 of tube 18 positive, the secondary winding 13 begins to drive the control grid 25 of the tube 26 negative, the transformer windings 12 and 13 being arranged so that their respective output voltages are exactly 180° out of phase.

As the secondary winding 12 begins, at a desired position relative to a half cycle of main line voltage, to drive grid 17 positive, grid current will flow through the tube 18 to charge the capacitor 15. After the peak of voltage at the secondary winding 12 occurs, that is to say after about a quarter cycle, grid current flow through the tube 18 ceases due to the charge on the capacitor 15, this charge then causing the grid 17 to immediately become negative with respect to the cathode 21. The capacitor 15 then begins to discharge through the resistor 14. During the following half cycle of negative voltage at the secondary winding 12, current continues to flow through the resistor 14, the value of which is selected to cause complete discharge of the capacitor 15 during this period. At this time the grid 17 resumes the negative potential of secondary 12. Current continues to flow through resistor 14, which would otherwise tend to reverse the charge in capacitor 15, until the end of the half cycle by rectifier 16.

It will be seen that rectifier 16 prevents the build-up of any reversed charge on the capacitor 15, so that when the secondary 12 again begins to drive the grid 17 positive, that is to say during the next positive half cycle, the voltage of the secondary winding 12 is not displaced by any reverse charge upon the capacitor. This ensures that the point at which the grid 17 again begins to go positive is dependent only upon the voltage of the secondary winding 12, which is displaced in phase from the line voltage an amount dependent upon the setting of the phase shift circuit.

The operation of the grid circuit of tube 26 is identical with that just described, except occurring with a phase difference of 180° due to the fact that the two transformer secondaries 12 and 13 are, as previously described, exactly 180° out of phase.

Upon closure of the initiating contact 29 when, for example, line 1 is positive, positive voltage appears upon the anodes 27 and 39 of tubes 26 and 38, respectively. At a phase position determined by the setting of the phase shift circuit, secondary winding 13 will begin to make the grid 25 of the tube 26 positive with respect to the cathode 28 thereof. The tube 26 will thereby begin to conduct, current passing through the rectifier 35, the contact 29, the tube 26, the rectifier 44 and the igniter 42 to cause the ignition of ignitron 38. Welding current will then pass from the line 1 through the conductor 34 and the ignitron 38, through the welding transformer 45 to energize the secondary 46 thereof. Upon cessation of ignitron 38 conduction, which will occur during the following half cycle, the positive voltage of line 2 is applied to the anodes 19 and 37 of tubes 18 and 32 respectively. Then, at a point exactly 180° later in phase than the point at which secondary 13 started to make grid 25 positive, the secondary winding 12 starts to drive the grid 17 of the tube 18 positive with respect to the cathode 21. Tube 18 will then conduct, current passing through rectifier 43, tube 18, contact 29, rectifier 36 and igniter 31 to effect conduction of ignitron 32. Weld current will thereupon pass from line 2 through weld transformer 45 and ignitron 32 to line 1. During the next half cycle, the ignitron 32 will cease to conduct and the cycle will be repeated, alternate half cycles of weld current continuing to pass through weld transformer 45 until the contact 29 is opened.

The foregoing is illustrative of the type of welding circuit which may be used with the magnetically actuated control and indicating means according to the present invention which will now be described. A normally closed switch 50, in series with the initiating switch 29, is arranged to control the conduction of ignitrons 32 and 38. Connected between the leads to the cathodes of thyratron tubes 18 and 26 is a normally open switch 52. The switch 52 when closed will divorce the ignitrons 32 and 38 from the control of the thyratrons 18 and 26 so that the ignitrons will be alternately conductive independently of the phase shift means which includes the thyratrons 18 and 26 in the circuit previously described. A normally open switch 53 may be mechanically connected with the switch 50 as shown. The switches 50 and 53 are arranged to be actuated by a magnetic relay 54 through an energizing circuit which will be hereinafter described. The secondary transformer winding 55, energized by the primary winding 3, is connected through lead 57 with a parallel circuit that includes winding of the magnetic relay 54 and an indicating means 56 which may consist of an ammeter, as shown, a bell and/or an electric light bulb. The switch 53 connects the indicating means 56 with the lead 58 which is connected with the other terminal of winding 55. A lead 59 is arranged to connect the coil winding of relay 54 with one of the terminals 61 of the magnetically actuated means 60 which may consist of a meter relay as shown in FIG. 2 of the drawings. The other terminal 61 of the magnetically actuated means 60 is connected to the lead 58 as shown. The terminals 62 of the magnetically actuated means 60 are connected across the primary winding of transformer 45.

The magnetically actuated means 60 as shown in FIG. 2, includes an actuating coil 63, an indicating pointer 64, a pair of spaced contacts 65 and 66 engageable by the pointer 64, a release means 67, a damping means 68, a current limiting resistor 69, a magnetic yoke 72, and leads 70 and 71. The meter relay is more or less of conventional construction and has its internal parts connected with terminals 61 and 62 as shown. Thus, whenever ignitrons 32 and 38 are operating normally, alternating current passing through the primary winding of transformer 45 will cause a voltage to be impressed across the terminals 62. The flow of current from the terminals 62 through the coil 63 will be limited by the resistor 69. The magnetic field which accompanies the current flow through the coil 63 will react with the magnetic field of yoke 72 and cause the pointer 64 to be moved either to the left or right, depending upon the direction of current flow through coil winding 63. The movement of the pointer 64 in response to alternating current flow is prevented by the damping means 68, and the pointer 64 will remain relatively stationary when alternating current flows through the coil winding of transformer 45.

When either of the ignitrons 32 or 38 becomes inoperative, the remaining ignitron will cause a pulsating direct current to flow through transformer 45. This pulsating direct current when impressed across the coil winding 63 will overcome the damping effect of the damping means 68 and the pointer 64 will move either to the right or left to engage the contacts 66 or 65 respectively. The contacts 66 and 65 are preferably formed of magnetic material to hold the pointer 64 in its engaging position once the engagement is formed therebetween. The lead 70 is connected through one of the terminals 61 with lead 59. The lead 71, connected to pointer 64 is connected through the other terminal 61 to lead 58. Thus, when the pointer 64 engages either one of the contacts 65 or 66, a circuit will be completed from the transformer winding 55 to the relay 54 and the coil of relay 54 will be energized to open switch 50 and close switch 53. When switch 50 opens, the circuit through both ignitrons 32 and 38 is broken and the conduction of both ignitrons will cease. When the switch 53 closes, a circuit to the indicating means is completed to advise the operator that the circuit through the ignitrons is open and the welder is no longer operative. The position of the pointer 64 of the meter relay will advise the operator which of the ignitrons 32 or 38 has became inoperative. After the defective ignitron has been replaced the release means 67 may be pushed or pulled in the proper direction to break the engagement between the pointer 64 and the respective contacts 65 or 66 to return the indicating means to its normal operating position and de-energize relay 54 to restore the operation of the ignitrons.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In an electronic contactor, the combination comprising a transformer arranged to supply alternating current to an alternating current load, a pair of electronic switches arranged to control the flow of alternating current through the transformer, a phase-shifting means connected to a control electrode of the electronic switches and operative to control the conduction periods of the switches and to cause the switches to supply alternate half waves of current of predetermined magnitude to the transformer, a meter relay operatively connected to the transformer and the switches so as to be responsive to current flowing through the transformer and the switches for detecting failure of either one of the switches, said meter relay including means operative upon failure of either one of the pair of switches to indicate which one of the switches failed, electroresponsive relay means operative when energized to disconnect the phase-shifting means from both of the switches, and said meter relay including means for causing energization of said relay means upon detection by said meter relay of failure of either of the switches.

2. In an electric welding apparatus, the combination comprising a welding transformer arranged to supply alternating current to a pair of welding electrodes, a pair of ignitrons arranged to control the flow of alternating current through the welding transformer, a phase-shifting means connected to the ignitrons and operative to control the conduction periods of the ignitrons and to cause the ignitrons to supply alternate half waves of current of predetermined magnitude to the transformer, a meter relay operatively connected to the welding transformer and the ignitrons so as to be responsive to current flowing through the transformer and the ignitrons for detecting failure of either one of the ignitrons, said meter relay including means operative upon failure of either one of the pair of ignitrons to indicate which one of the ignitrons failed, electro-responsive relay means operative when energized to disconnect the phase-shifting means from both of the ignitrons, and said meter relay including means for causing energization of said relay means upon detection by said meter relay of failure of either of the ignitrons.

3. In an electric welding apparatus, the combination compirsing a welding transformer ararnged to supply alternating current to a pair of welding electrodes, a pair of ignitrons arranged to control the flow of alternating current through the welding transformer, a phase-shifting means connected to the ignitrons and operative to control the conduction periods of the ignitrons and to cause the ignitrons to supply alternate half waves of current of predetermined magnitude to the transformer, a meter relay operatively connected to the welding transformer and the ignitrons so as to be responsive to current flowing through the transformer and the ignitrons for detecting failure of either one of the ignitrons, said meter relay including means operative upon failure of either one of the ignitrons to indicate which one of the pair of ignitrons failed, normally deenergized electroresponsive relay means operative when energized to disconnect the phase-shifting means from both of the ignitrons, and said meter relay having contacts operable to close and thereby cause energization of said relay upon detection by said meter relay of failure of either of the ignitrons.

4. An electronic control circuit comprising an alternating current supply source, an alternating current load circuit, a pair of ignitrons interposed between the supply source and the load circuit for conducting alternating current from the source to the load circuit, means for controlling the duration of the conduction periods of the ignitrons thereby to control the effective magnitude of said flow of alternating current, protective means operable to cause said ignitrons to cease conduction, electromagnetic means having an operating coil connected directly across at least a portion of said load circuit, said electromagnetic means remaining quiescent when said load circuit is deenergized and when said load circuit is energized with alternating current, said electromagnetic means being movable to a first position upon said load circuit carrying direct current in one direction and to a second position upon said load circuit carrying direct current in the other direction, and means operative upon movement of said electromagnetic means to either one of said first or second positions to operate said protective means.

5. In an electronic welding apparatus, the combination comprising a welding transformer arranged to supply alternating current to a pair of welding electrodes, a pair of ignitrons arranged to control the flow of alternating current through the welding transformer, a phase shifting means operative to control the conduction periods of the ignitrons, electroresponsive means operatively connected to the welding transformer and the ignitrons so as to be responsive to current flowing through the transformer and the ignitrons and operative upon failure of either one of the ignitrons to cause interruption of current flow through the other ignitron, and said electroresponsive means including a meter relay having a pointer normally in a neutral position and movable from a neutral position to a first one of two indicating positions upon failure of one of said pair of ignitrons and movable from the neutral position to a second of the two indicating positions upon failure of the other of said pair of ignitrons for indicating which one of the ignitrons has failed, a releasable holding means for holding the pointer in either of its indicating positions after the pointer has moved thereto from its neutral position, and a reset means for releasing the pointer from said holding means.

References Cited by the Examiner

UNITED STATES PATENTS 2,574,374  11/51  Bivens _____ 323—24 X
2,703,383   3/55  Anger _____ 323—24

LLOYD McCOLLUM, *Primary Examiner.*